United States Patent
Brune et al.

(10) Patent No.: US 9,918,553 B2
(45) Date of Patent: Mar. 20, 2018

(54) CARRYABLE LAYOUT BLIND

(71) Applicant: ACTIVE LIFESTYLE PRODUCTS & SERVICES, INC., New Haven, MO (US)

(72) Inventors: Adam Brune, New Haven, MO (US); Zach Scheidegger, Washington, MO (US)

(73) Assignee: ACTIVE LIFESTYLE PRODUCTS & SERVICES, INC., New Haven, MO (US)

( * ) Notice: Subject to any disclaimer, the term of this patent is extended or adjusted under 35 U.S.C. 154(b) by 0 days.

(21) Appl. No.: 15/340,702

(22) Filed: Nov. 1, 2016

(65) Prior Publication Data
US 2017/0127837 A1    May 11, 2017

Related U.S. Application Data

(60) Provisional application No. 62/249,663, filed on Nov. 2, 2015.

(51) Int. Cl.
| | |
|---|---|
| *A47C 4/28* | (2006.01) |
| *A47C 7/66* | (2006.01) |
| *A01M 31/02* | (2006.01) |
| *E04H 15/58* | (2006.01) |
| *E04H 15/48* | (2006.01) |
| *E04H 15/02* | (2006.01) |
| *E04H 15/00* | (2006.01) |
| *A45F 4/02* | (2006.01) |

(52) U.S. Cl.
CPC ............ *A47C 4/28* (2013.01); *A01M 31/025* (2013.01); *A47C 7/66* (2013.01); *E04H 15/008* (2013.01); *E04H 15/02* (2013.01); *E04H 15/48* (2013.01); *E04H 15/58* (2013.01); *A45F 2004/026* (2013.01)

(58) Field of Classification Search
CPC ....... A47C 7/66; A47C 4/28; A45F 2004/026; A01M 31/025; E04H 15/58; E04H 15/48; E04H 15/02; E04H 15/008
USPC .... 297/16.1, 53, 184.1, 900, 354.13; 135/90
See application file for complete search history.

(56) References Cited

U.S. PATENT DOCUMENTS

| | | | | |
|---|---|---|---|---|
| 1,292,200 | A * | 1/1919 | Williams | A47C 4/24 297/256.15 |
| 4,514,009 | A * | 4/1985 | Vanderminden | A47C 1/14 297/16.1 |
| 4,801,176 | A * | 1/1989 | Wolberg | A47C 4/286 297/44 |
| 6,113,181 | A * | 9/2000 | Tang | A47C 1/143 297/188.04 |
| 7,997,291 | B2 * | 8/2011 | Gressette, III | A01M 31/02 135/117 |
| 2012/0286544 | A1 * | 11/2012 | Cohen | A47C 4/46 297/30 |

* cited by examiner

*Primary Examiner* — Milton Nelson, Jr.
(74) *Attorney, Agent, or Firm* — Lewis Rice LLC (57) ABSTRACT

A carryable temporary layout blind comprising a frame for elevating the seating elements off the ground, and one or more closeable doors or flaps with a handle for simple and rapid opening and closing. The layout blind is collapsible into a carryable configuration and includes straps for carrying the collapsed blind in a fashion similar to a backpack.

3 Claims, 8 Drawing Sheets

CARRYABLE LAYOUT BLIND

CROSS-REFERENCE TO RELATED APPLICATIONS

This application claims benefit of United States Provisional Patent Application No. 62/249,663, filed Nov. 2, 2015, the entire disclosure of which is incorporated herein by reference.

BACKGROUND

1. Field of the Invention

This disclosure relates to the field of hunting equipment, and more particularly to systems and methods for disguising the presence of a hunter.

2. Description of the Related Art

It is well known in hunting that camouflaging the hunter is often essential to success. Unlike most animals, humans are not naturally camouflaged and tend to stick out in the wilderness. Thus, hunters commonly wear camouflaged clothing or set up camouflaged structures to hide in, commonly known as "blinds."

Hunting blinds may be permanent or portable structures, and are manufactured in a variety of configurations. One such configuration is the "layout" or "laydown" hunting blind, which is configured to allow the hunter to sit or recline within the camouflaged structure. This allows the hunter to see the surroundings and monitor for prey, while keeping the majority of the hunter camouflaged by the blind. Often, the hunter has a weapon loaded within the blind. When prey is spotted, the hunter can quickly release the cover and sit or stand to fire the weapon at the prey.

One problem with layout blinds is that closing the blind can be difficult. For example, the lower body and torso should be covered by the blind as much as possible for maximum camouflage, but positioning and covering oneself within the blind can be difficult. The hands must be free to arrange the camouflage over the body, but retrieving the hands within the cover can disturb the camouflage previously set.

Relatedly, even minor movements of the hunter within the blind can disrupt the camouflage, or cause parts of the hunter to become exposed, requiring that the camouflage be reset. The more that the hunter arranges the camouflage, the more likely the hunter's movements are to scare off prey.

Other problems include the fact that layout blinds are generally deployed directly on the ground, which causes the blind itself to become soiled and may be uncomfortable for the hunter, particularly if the hunter must remain in place for an extended period of time. Where the ground is wet or moist, such as in marshes or wetlands, this may cause the hunter to become wet or chilled.

Another problem is that blinds tend to be bulky and difficult to transport. This is particularly true with layout blinds, which are approximately the size and shape of a person. Typically, the hunter will drive to a location near where the blind is to be set up. In this scenario, the blind will be transported only a short distance from the hunter's vehicle. However, dragging the blind to the spot can soil it. Where a good hunting location is a long distance from navigable roadways, which can make it difficult for the hunter to get the blind to the location.

What is needed in the art is a portable and easily carryable temporary layout hunting blind which elevates the hunter from the ground, and is easy and fast to configure.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a carryable temporary layout blind comprising a frame for elevating the seating elements off the around, and one or mere closeable doors or flaps with a handle for simple and rapid opening and closing. The layout blind described herein is collapsible into a carryable configuration and includes straps for carrying the collapsed blind in a fashion similar to a backpack.

Described herein, among other things, is a layout hunting blind configured to collapse into a carryable configuration, comprising: a seating element; a lower frame comprising two lower frame opposing sidebars having a first part of the seating element attached thereto and disposed therebetween; an upper frame comprising two opposing upper frame sidebars having a second part of the seating element attached thereto and disposed therebetween, the upper frame hingedly attached to the lower frame, the attachment configured such that the upper frame and the lower frame may be folded together to dispose the two lower frame sidebars and the two upper frame sidebars in an adjacent and generally parallel position; a lower leg element having a distal end and being hingedly attached at an opposing proximal end to the lower frame, the attachment configured such that the lower leg element and the lower frame may be folded together to dispose the two lower frame sidebars and the lower leg element in an adjacent and generally parallel position; and an upper leg element having a distal end and being hingedly attached at an opposing proximal end to the upper frame, the attachment configured such that the upper kg element and the upper frame may be folded together to dispose the two upper frame sidebars and the upper leg element in an adjacent and generally parallel position; wherein the seating element is configured to accommodate a human in a reclining position when the layout hunting blind is unfolded.

In an embodiment of the layout hunting blind, the two lower frame sidebars comprise first ends and opposing second ends and are bent at an angle, the bend being disposed between the hinged attachment of the upper frame and the second ends.

In another embodiment of the layout hunting blind, when the angle of the bend is configured such that when the lower kg element is unfolded and the lower leg element and the second ends are disposed on the ground, the first part of the seating element is elevated above the ground.

In another embodiment of the layout hunting blind, when the lower leg element is unfolded and the upper leg element is disposed on the ground, the second part of the seating element is elevated above the ground.

In another embodiment of the layout hunting blind, the lower leg element comprises lower leg element sidebars having distal ends and opposing proximal ends, the lower leg element sidebars being connected at the distal end by a crossbar; and the hinged attachment of the lower leg element to the lower frame comprises the lower kg element sidebars being hingedly attached to the lower frame sidebars.

In another embodiment of the layout hunting blind, the lower leg element crossbar comprises a bend about at a midpoint such that the lower leg element is generally in the configuration of a W.

In another embodiment of the layout hunting blind: the upper leg element comprises upper leg element sidebars having distal ends and opposing proximal ends, the upper leg element sidebars being connected at the distal end by a crossbar; and the hinged attachment of the upper leg element to the upper frame comprises the upper leg element sidebars being hingedly attached to the upper frame sidebars.

In another embodiment of the layout hunting blind, the upper leg element crossbar comprises a bend about at a midpoint such that the upper leg element is generally in the configuration of a W.

In another embodiment of the layout hunting blind, the blind further comprises: the lower frame comprising a foot end and the upper frame comprising a head end, the foot end being disposed at the opposing end of the layout hunting blind from the head end when the layout hunting blind is unfolded; and a fabric skirt attached to the upper frame and the lower frame.

In another embodiment of the layout hunting blind, the fabric skirt is configured to hide the lower leg element and the upper leg element from view when the layout blind is unfolded.

In another embodiment of the layout hunting blind, the fabric skirt is configured to have a generally linearly taut portion from the head end to the foot end when the hunting blind is unfolded.

In another embodiment of the layout hunting blind, the blind further comprises a door attached to the fabric skirt at the generally linearly taut portion.

In another embodiment of the layout hunting blind, the door is sized and shaped such that when the door is closed, a human occupant reclining in the layout hunting blind is hidden from view.

In another embodiment of the layout hunting blind, the door comprises at least two rigid panels disposed in a fabric sheathe, the door being foldable between the at least two rigid panels.

In another embodiment of the layout hunting blind, the blind further comprises a means for retaining the layout hunting blind in a folded configuration.

In another embodiment of the layout hunting blind, the retaining means comprises one or more straps.

In another embodiment of the layout hunting blind, the blind further comprises a means for carrying the layout hunting blind in a folded configuration.

In another embodiment of the layout hunting blind, the carrying means comprises one or more adjustable shoulder straps.

Also described herein, among other things, is a method for collapsing a deployed layout hunting blind comprising: providing a layout hunting having a collapsed configuration and a deployed configuration, the layout hunting blind comprising: a lower frame; an upper frame hingedly attached to the lower frame; a seating element attached to the lower frame and to the upper frame; a lower kg element hingedly attached to the lower frame; and an upper kg element hingedly attached to the upper frame; wherein the lower leg element and the upper leg element support the lower frame and the upper frame above the ground in the deployed configuration; folding the upper frame to be adjacent to a top side of the lower frame; folding the upper leg element to be adjacent to a back side of folded upper frame; folding the lower leg element to be adjacent to a bottom side of lower frame, the bottom side opposing the top side.

Also described herein, among other things, is a collapsible layout hunting blind comprising: a lower body reclining means; an upper body reclining means hingedly attached to the lower body reclining means; a lower body support means hingedly attached to the lower body reclining means; and an upper body support means hingedly attached to the upper body reclining means.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

The term "camouflage" as used in this disclosure generally means the use of materials, coloration, shading, shaping or physical structure, or illumination for concealment, generally by making the thing camouflaged more difficult to see, or making it appear to be something other than what it is. In the context of hunting, camouflage may comprise, without limitation, the use or addition of colors, shapes, textures, tones, prints, or Objects configured and/or selected to match a particular environment and/or season.

Figure 1:
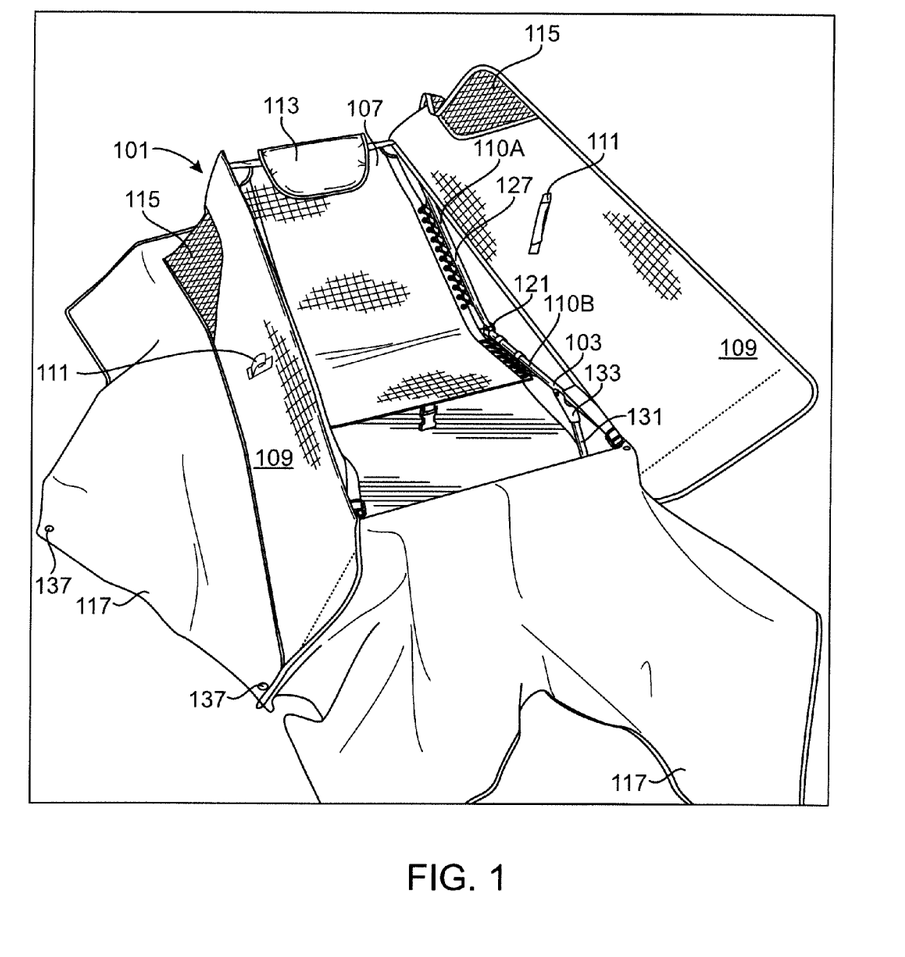
FIG. 1 depicts an embodiment of a layout blind in assembled configuration.
Figure 2:
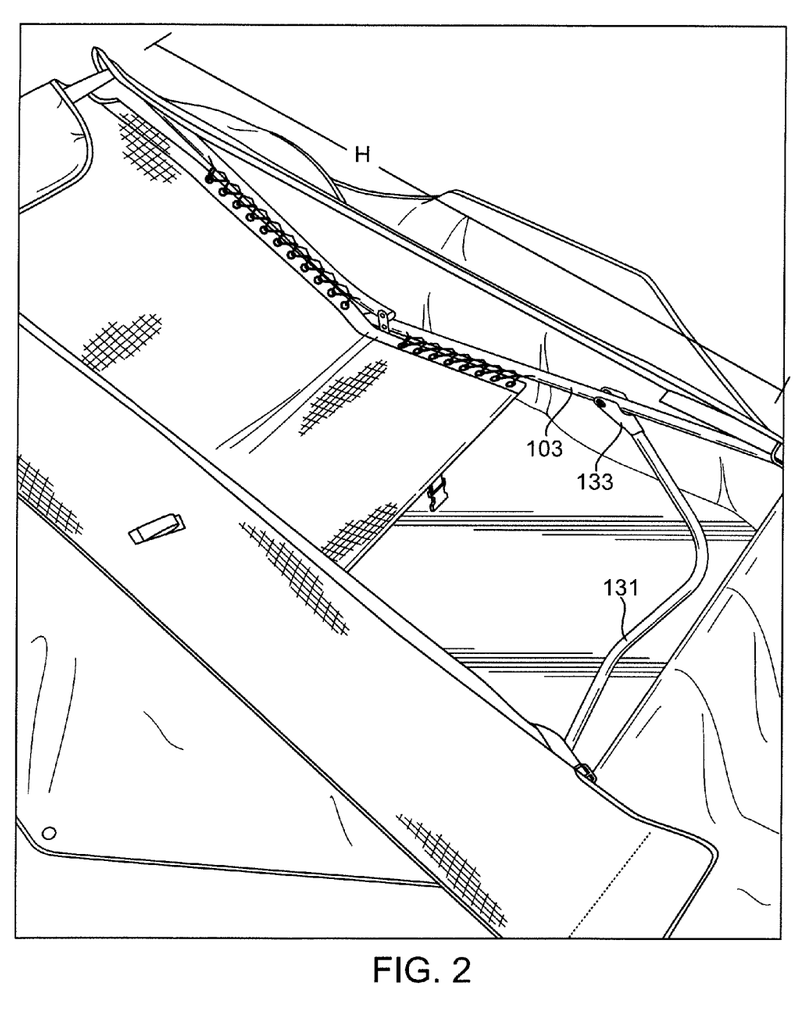
FIG. 2 depicts an embodiment of a layout blind in assembled configuration, showing lower leg elements.

An embodiment of the layout blind in assembled configuration is depicted in FIG. 1. The depicted blind (101) of FIG. 1 comprises a lower frame (103) with a seating element (107) attached thereto. The seating element (107) may include a headrest (113). The lower frame (103) is generally made from a rigid, rugged material of sufficient structural strength to support the weight of an adult male. The lower frame (103) generally comprises two generally parallel bars (104A) and (104B) with a portion of a seating element (107) attached thereto and extending therebetween. As can be more fully seen in FIG. 7, lower frame (103) may further comprise a leg element (123), referred to herein as the center leg element (123) to distinguish from other leg structures.

Figure 7:
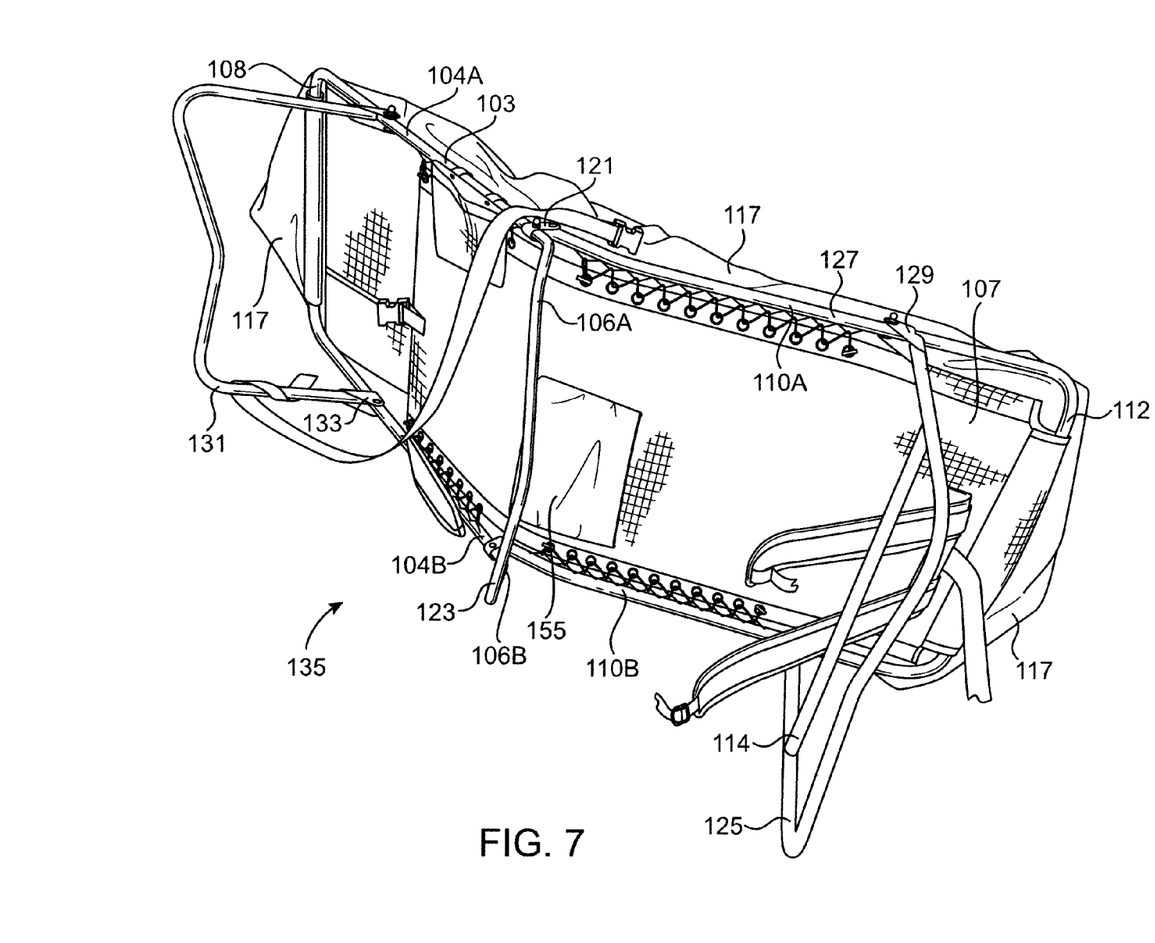
FIG. 7 depicts a bottom elevation of a layout blind in assembled configuration.

In the depicted embodiment of FIGS. 1 and 7, the side bars (104A) and (104B) of lower frame (103) are generally straight and parallel. The lower frame (103) provides support for the hunter's lower body, with the seating element (107) and distance between the side bars (104A) and (104B) configured to accommodate the hips and buttocks comfortably.

Each of the side bars (104A) and (104B) terminates in an angled element (106A) and (106B), which form a part of the center leg element (123). In the depicted embodiment, a crossbar (123) extends between the legs (106A) and (106B) of lower frame (103), but in an alternative embodiment, legs (106A) and (106B) have no crossbar and independently support the device. Side bars (104A) and (104B) are also connected by a crossbar (108) at the distal end of the lower frame (103) opposing the center leg element (123). Crossbar (108) helps to stabilize the structure and provides additional strength. Also, as shown in FIG. 7, the crossbar (108) is useful for attaching a portion of the skirt (117).

The overall shape of lower frame (103) is rectangular or quadrilateral, with the width dimension being based on human ergonomics, in particular body width. The length dimension is also generally based on human ergonomics, and in particular is configured to provide legroom. That is, the length is large enough to accommodate an adult sitting in seating element (107) with the legs and knees inside crossbar (108). This allows the user to stretch while in the blind (101). The elevated seating position also makes it easier to sit up, aim, and fire a weapon.

In the depicted embodiment of FIG. 1, the seating element (107) extends between the side bars (104A) and (104B) of lower frame (103) and an upper frame (127). The upper frame (127) is movably and foldably attached to the lower frame (103) via a joint (121). In the depicted embodiments of FIGS. 1 and 7, joint (121) includes a hinge element attached to lower frame (103) and using hardware to hingedly connect upper frame 127) thereto, tipper frame (127) is also generally constructed of two generally parallel side bars (110A) and (110B) made from a rigid material capable of supporting the upper body weight of an adult. Side bars (110A) and (110B) of upper frame (127) are connected by a crossbar (112) at the distal end opposing the connecting joint (121), again generally for stability, and to provide a place for attaching seating element (107) and/or the skirt (117).

Seating element (107) in the depicted embodiment is constructed from a generally flexible material for comfort, strong enough to support the weight of an adult. The material also should have the flexibility to allow the seat to adapt to the contours of the hunter's body for additional comfort. The depicted seating element (107) comprises a plurality of grommets at opposing sides, which grommets are used to attach the seating element (107) to side bars (104A) and (104B) and to side bars (110A) and (110B). In the depicted embodiment, the seating element (107) is attached using a durable, rugged fabric, thread, or rope. By way of example, but not limitation, such material may be nylon or polyester. Seating element (107) also is flexible so that when upper frame (127) is folded against lower frame (103), the seating element (107) also folds for storage. The seating element may be attached using other means, such as, without limitation, a sewn loop, or a hook-and-loop system. In an embodiment, the seating element (107) may comprise further structures or features, such as reinforcing or stabilizing elements to provide additional back support. Such elements may include, for example, rigid or semi-rigid ribs, straps, or bars, or rigid or semi-rigid plates or panels sewn into or otherwise attached to the seating element (107).

The lower frame (103) and upper frame (127) are generally sized and shaped similarly, such that when the upper frame (127) is folded against lower frame (103), the frames (103) and (127) are generally parallel and have similar dimensions, forming a more compact, generally rectangular shape. In the folded configuration, the crossbar (112) of upper frame 127) is near the crossbar (108) of lower frame (103).

In an embodiment, the lower frame (103), associated portion of the seating element (107), and the component parts of each together comprise a lower body reclining means. In an embodiment, the upper frame (127), associated portion of the seating element (107), and the component parts of each together comprise an upper body reclining means.

Referring again to FIG. 1, the blind (101) further includes one or more flaps (109) or doors (109). When the blind (101) is assembled, the crossbar (112) of the upper frame (127) and the crossbar (108) of the lower frame (103) are generally disposed at opposing ends of the blind (101), and are generally parallel to one another. The four corners of crossbars (108) and (112) define a generally rectangular opening, as can be seen in FIG. 1, with seating element (107) recessed therein.

The doors (109) are generally in the configuration of a rectangle, and are attached to the frame via the skirt (117). Although two doors are depicted, other configurations are specifically contemplated, including, without limitation, single-door and four-door configurations. In a configuration with two doors (109), such as that depicted in FIG. 1, the doors (109) are movably attached at opposing sides of the blind (101) and can be closed similar to French doors. The depicted doors (109) comprise a handle (111) disposed on the inside of the door (109). The handle (111) can be grasped by the hunter when seated in seating element (107) and used to pull the doors (109) shut over the hunter's body. In the depicted embodiment, the doors (109) are hingedly attached to opposing sides of the skirt (117) and swing inward toward the middle of the device (101) to close, but other connection locations and operating geometries are possible, such as, without limitation connecting one or more doors (109) along the short side.

It also should be noted that in some configurations, it may be desirable to provide a means or mechanism for fully or partially fastening the doors (109) in a closed position, such as for transportation or to inhibit disturbing the doors (109) when the hunter moves or shifts within the blind (101). A fastener or fastening system may thus be included, such as but not necessarily limited to a zipper, buckle, hook, snap, or other such fastening means.

The doors (109) are generally constructed from fabric with one or more rigid or semi-rigid elements disposed therein, such as panels and/or bars. This may be done, for example, by sewing one or more rigid pipes or bars around some or all of the perimeter of the door (109). This imparts some rigidity and structure to the door (109), such that when the hunter pulls on the handle (111) the door (109) pulls shut over the hunter, eliminating the need to manually set camouflage fabric over the hunter. Because the hunter, when disposed in the blind (101), has the majority of his lower torso below the plane of the doors (109) when closed, the doors (109) will generally close over the top of the hunter. Also, by providing at least some rigidity reinforcing elements, as opposed to only cine, the doors (109) also may be folded with the rest of the blind (101) as described elsewhere herein.

The doors (109) have a distal end disposed generally near crossbar (108), and an opposing transparent or semi-transparent portion (115) disposed generally near crossbar (112). This element (115) provides some protection to the hunter's head from the elements (e.g., sun, precipitation, and pests), while also giving the hunter a view of the skyline to watch for prey. Also, the mesh provides camouflage for the hunter's face, which may otherwise provide a high-contrast element that reveals the hunter's location, particularly for hunters with a light complexion. Preferably, this material (115) is also at least semi-flexible, again to facilitate the collapsing and folding of the blind (101). In the depicted embodiment, this element (115) is made from a mesh fabric.

In the depicted embodiment of FIG. 1, the blind (101) comprises a skirt (117) which is generally disposed around the perimeter of frames (103) and (127) and sized and shaped such that when the blind (101) is assembled, the skirt (117) drapes down from frames (103) and (127) to, and across, the ground. The skirt (117) is generally camouflaged, such as with a camouflage print, to cause the blind (101), when assembled, to blend into the surroundings. The skirt (117) provides further camouflage of the hunter's torso and lower body from the side, front and back angles, while also providing a windbreak, as well as insulative properties for warmth and comfort. It is preferable that the skirt (117) be a flexible element, such as a durable fabric, so that it may be spread out to reduce shadows.

Figure 8A:
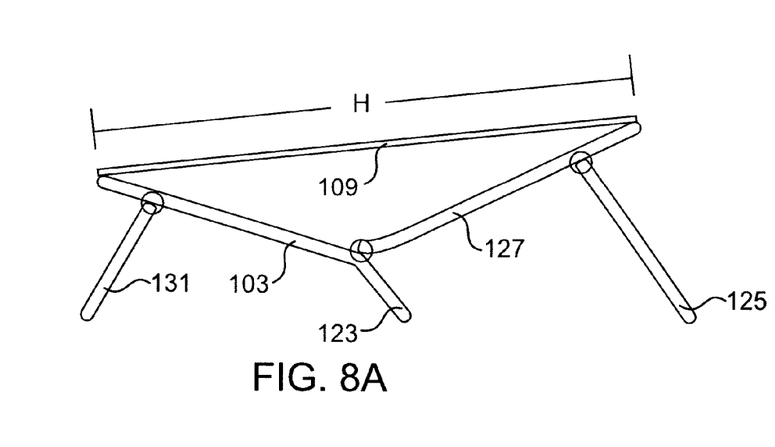
FIGS. 8A, 8B, and 8C depict side elevations of a layout blind, frame in various stages of collapsing.

It should be noted that the dimensions of frame elements (103) and (127) and the door elements (109) are configured in cooperation such that when the frame (103) and (127) is assembled, the side of the door (109) connected to the skirt (117) is taut between the opposing ends of the frames (103) and (127). That is, if the height of the door (109) is too great, the door (109) will droop and produce shadows, reducing the effectiveness of the camouflage. However, if the door (109) height is too short, the blind (101) cannot be fully deployed, or the door (109) fabric may tear. This can be seen in FIGS. 8A, 8B and 8C, which depict the process of collapsing a deployed layout blind (101) according to the present disclosure. The height of the door (109) is indicated in FIG. 8A as element H. As can be seen in FIG. 8A, the height of the door (109) is about the same as the linear distance between the opposing ends of lower frame (103) and upper frame (127) (i.e., crossbars (108) and (112)).

Figure 3:
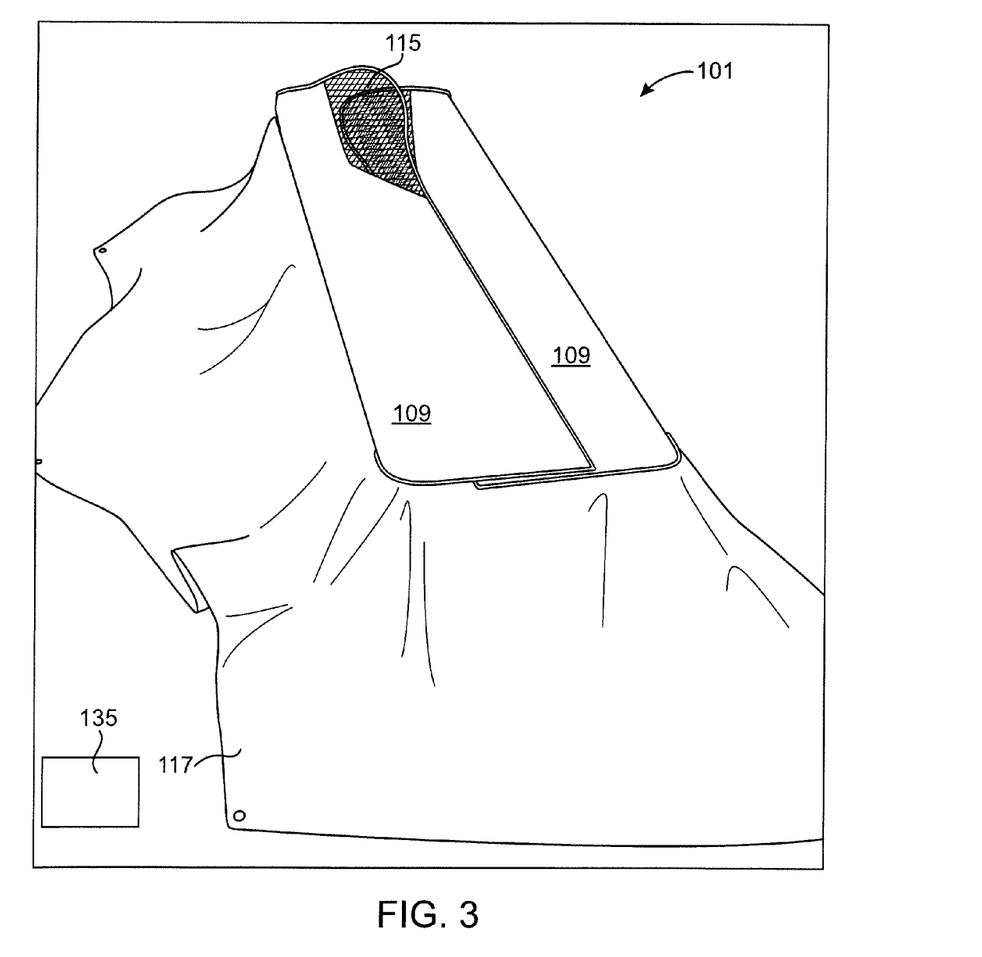
FIG. 3 depicts an embodiment of a layout blind in assembled and closed configuration.

FIG. 3 depicts a blind (101) according to the present disclosure in closed configuration. In the depicted embodiment of FIG. 3, the doors (109) are closed for concealing a hunter within (not depicted). In the depicted embodiment, the doors (109) are sized and shaped so that they partially overlap when closed, but other configurations are possible, such as, without limitation, wherein the doors close together without overlapping. This helps to conceal hunters of various sizes and shapes, and provides additional insulating properties. When closed, the transparent viewing portions (115) also overlap so that the hunter can see through both doors (109) when disposed in the blind (101). The external side of the door (109) may be camouflaged, and the camouflage may further match the camouflage of the skirt (117). It is generally preferred that the camouflage (regardless of the type of camouflage used) is continuous from the doors (109) to the skirt (117), providing an unbroken camouflage which conceals the majority of the hunter's body from view when the doors (109) are closed.

Figure 4:
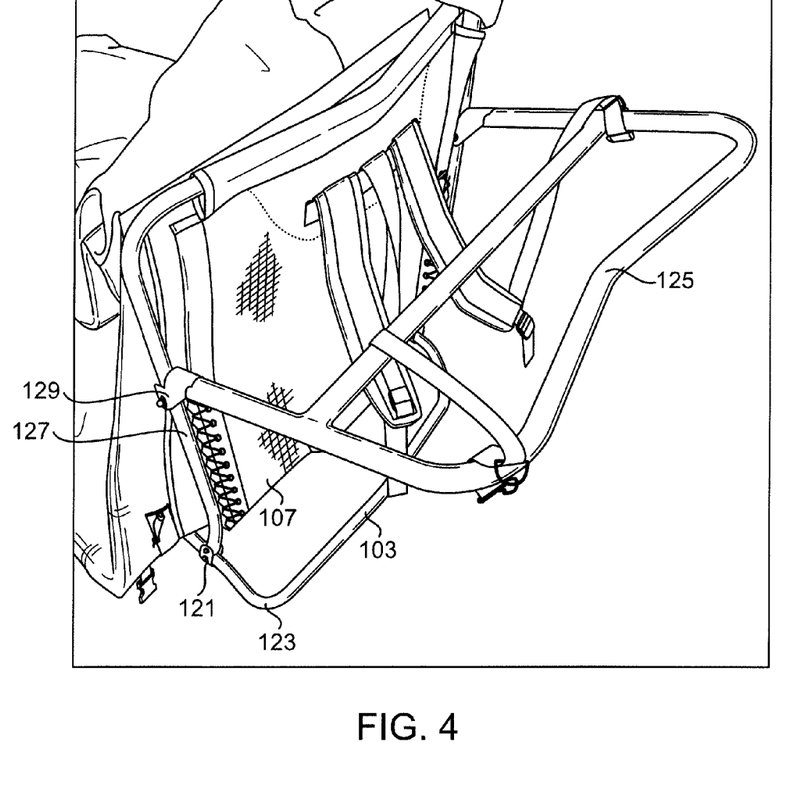
FIG. 4 depicts an embodiment of a layout blind in partially collapsed configuration.
Figure 5:
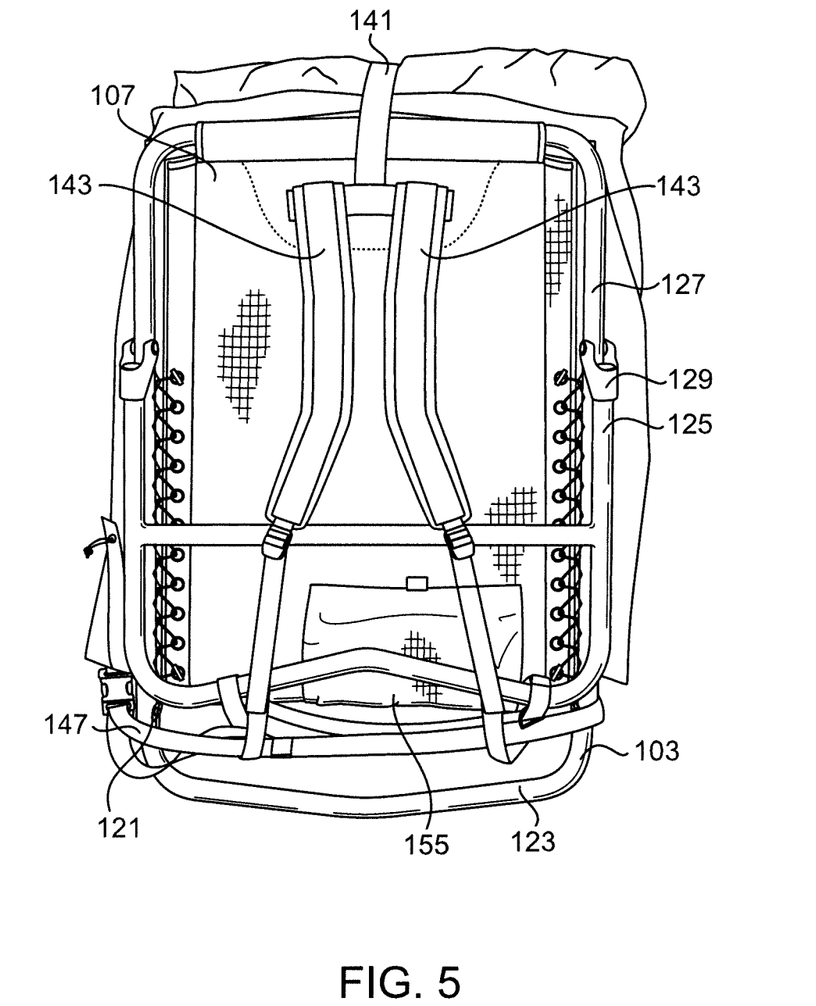
FIG. 5 depicts a front elevation of an embodiment of a layout blind in fully collapsed configuration.

As can be seen in the depicted embodiments of FIGS. 4 and 7, additional framing components may be used to stabilize the blind (101) when assembled. For example, in the depicted embodiment of FIG. 7, lower frame (103) has attached thereto a moveable lower leg element (131). The depicted lower leg element (131) is generally in the shape of a U or W with the stems movably attached to frame (103). It should be noted that in an alternative embodiment, the lower leg element (131) may have an alternative shape or connecting element, or may comprise two independent leg elements without a crossbar or other connecting element. The attaching joint (133) includes a bracing element which prevents the lower leg element (131) from hyperextending, locking instead into a stable deployed position. Thus, when the blind (101) is deployed, lower leg element (131) and center leg element (143) cooperate to provide stabilizing points with the ground, which holds the lower frame (103) in place, and elevates the seating element (107) from the ground.

It should be noted that the length of the stems of lower leg element (131) and the angled elements (106A) and (106B) of lower frame (103) determine the height of seating element (107) from the ground. Thus, the dimensions of these structures are configured to provide an elevated seat (107) which does not touch the ground when a person is seated, similar to a zero-gravity chair.

Similarly, upper frame (127) also has moveably attached thereto an upper leg element (125) which serves the same general purpose as lower leg element (131) with respect to the hunter's upper torso. That is, upper leg element (125) is a generally U or W shaped element with stems moveably attached to upper frame (127). It should be noted that in an alternative embodiment, the upper leg element (125) may have an alternative shape or connecting element, or may comprise two independent leg elements without a crossbar or other connecting element. Upper frame attaching joint (129) also includes a bracing element which prevents upper leg element (125) from hyperextending. Thus, when the blind (101) is deployed, there are three (or six) points of contact with the ground. The lower frame (103) is supported by lower leg element (131) and center leg element (123) and the upper frame (127) is supported by center leg element (123) and upper leg element (125). The force of gravity on the hunter will pull down on these elements, and the bracing elements in the joints (121) and (129) and (133) are configured such that the non-hyperextension points hold the device stable in an open configuration.

In the depicted embodiment of FIGS. 4 and 7, upper leg element (125) is hingedly attached to upper frame (127) to allow the device to be collapsed as described elsewhere herein. Also in the depicted embodiment of FIGS. 4 and 7, upper leg element (125) further comprises a stabilizing crossbar (114), which provides additional strength and rigidity for supporting the upper body, which is typically the heaviest part of the hunter. This crossbar (114) also provides a stabilizing element when the blind (101) is collapsed for transport as described elsewhere herein. As with other crossbars in this disclosure, in an alternative embodiment, this stabilizing bar may not be present, or may be connected in a different location or fashion from that depicted.

In an embodiment, the lower leg element (131) and its component parts comprise a lower body support means. In an embodiment, the upper leg element (125) and its component parts comprise an upper body support means.

Referring to FIGS. 5 and 8A, 8B and 8C, the collapsing aspects of the blind (101) are described. In the depicted embodiment of FIG. 5, the blind (101) is in collapsed configuration for transport. In the depicted embodiment, one or more shoulder straps (143) are attached to the underside of seating element (107). In the depicted embodiment, the shoulder straps (143) are attached to the back of the headrest (113), but the shoulder straps (143) may be attached at any point on the device. The attaching point is generally configured in consideration of human ergonomics, such that a human may carry the collapsed device using the shoulder straps (143) in a generally comfortable fashion. The shoulder straps (143) are also attached to the bottom crossbar of the upper leg element (125). The depicted shoulder straps (143) are adjustable to accommodate the size of different users.

Figure 6:
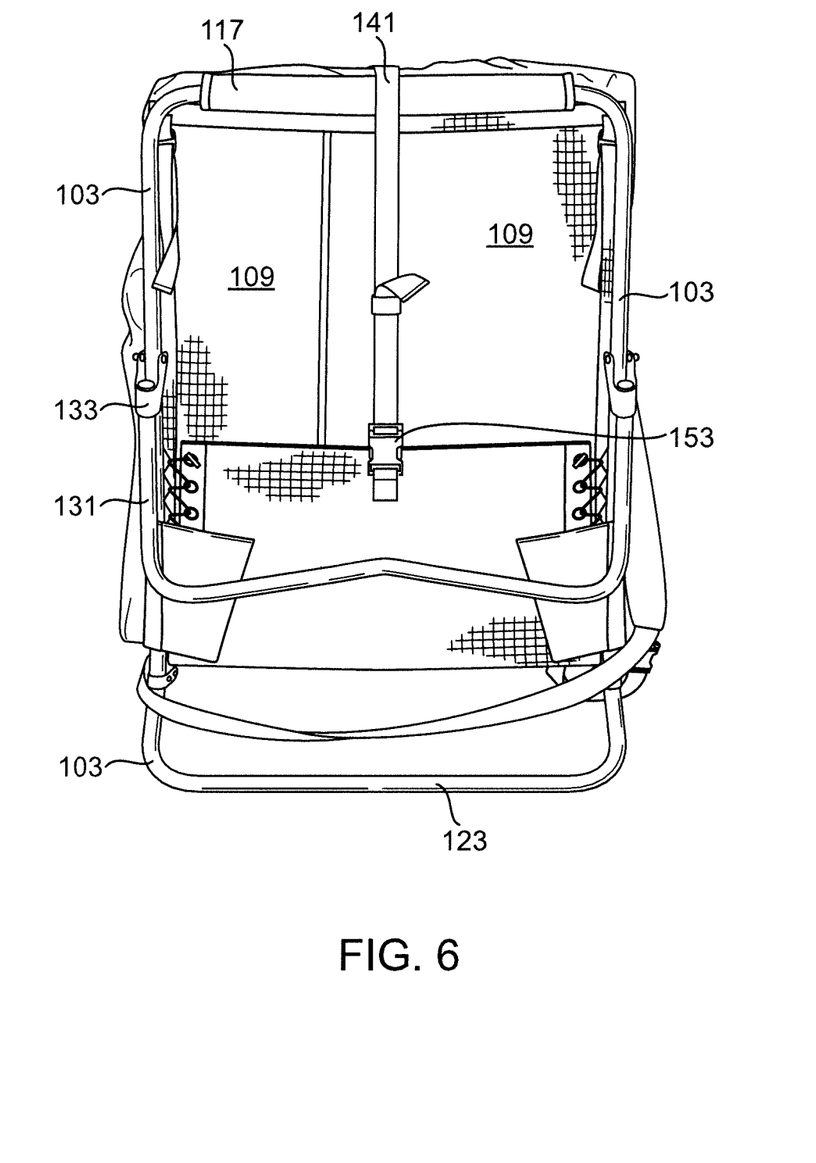
FIG. 6 depicts a back elevation of an embodiment of a layout blind in fully collapsed configuration.

Because the device (101) will naturally unfold by the force of gravity, a strap (141) is included to hold the collapsed device (101) together. In the depicted embodiment of FIGS. 5 and 6, strap (141) is attached to the bottom of seat (107) and connectable to a corresponding latch (153) also disposed on the back of seat (107). The attaching points for the strap (141) and latch (153) generally are on opposing ends of the bottom of seat (107) so that when the device (101) is collapsed, strap (141) may be disposed snugly over the top of the collapsed device and connected to the latch (153), preventing, the device from opening.

It should be noted that upper leg element (125) is moveably (129) attached to upper frame (127). Because shoulder straps (143) are attached to upper leg element (125), this poses the risk that upper leg element (125) will move with respect to the rest of the collapsed blind (101) when the hunter is carrying it. Thus, there is needed a means for preventing such movement when the device (101) is collapsed. In the depicted embodiment, this is done by means of a stabilizing strap (147) which may be disposed laterally around the collapsed blind (101) and connected to a latch near the attaching point for the stabilizing strap (147). The stabilizing strap (147) may be used as a belt around the waist of the hunter, thereby holding the collapsed blind (101) against the hunter's back and inhibiting the upper leg element (125) from falling open. Alternatively, the stabilizing strap (147) may be threaded inside the shoulder straps (143), which will also inhibit the collapsed blind (101) from opening. En an alternative embodiment, the stabilizing strap (147) may be omitted.

Other features of the depicted blind (101) include on ear more stakes (135), depicted in FIG. 7, for securing the skirt (117) to the ground. As described elsewhere herein, it is preferred that skirt (117) be spread out from the blind (101) to reduce or eliminate shadows, which can reduce the effectiveness of camouflage. The skirt (117) may comprise one or more grommets (137) through which stakes (135) may be inserted to hold the skirt (117) taut from the main body of the device (101), reducing shadows. In the depicted embodiment, stakes (135) may be stored in a pouch (155) attached to the underside of the seat (107), or another element of the blind. The pouch (155) is generally sealable such as with a hook and loop system, zipper, or other means of securing the stakes (135) so they do not fall out in transport.

Figure 8B:
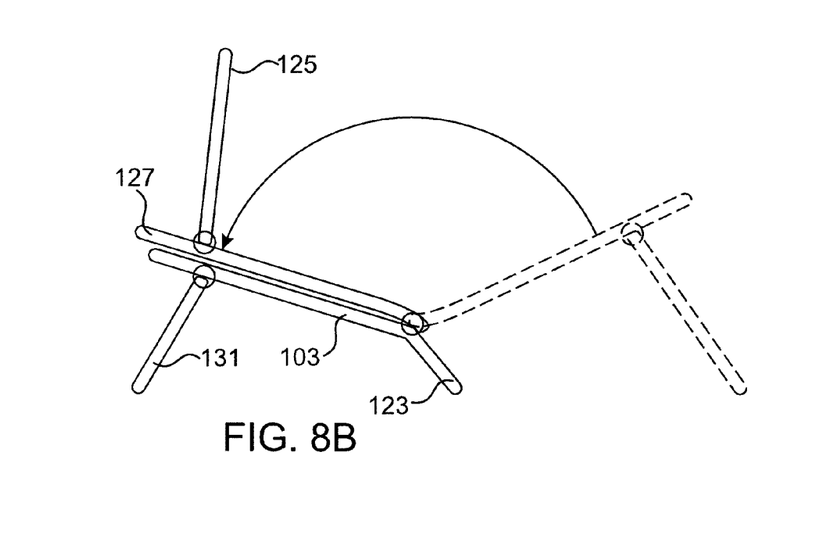
Figure 8C:
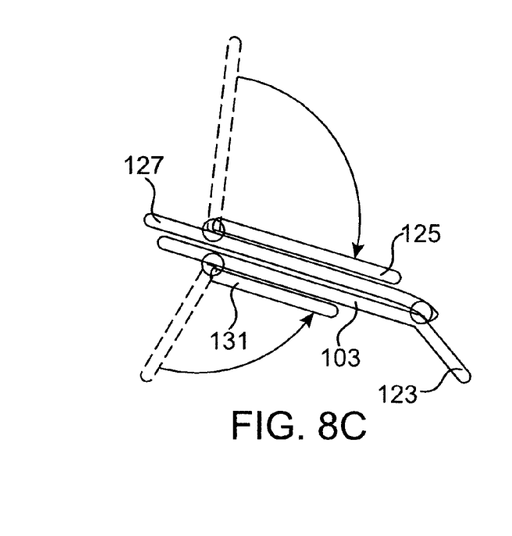

Referring now to FIGS. 8A, 8B and 8C, the method for collapsing the blind (101) is described. FIG. 8A depicts a side elevation view of a blind (101) in fully deployed configuration, with the skirt (117) and doors (109) omitted for clarity. Lower frame (103) is in contact with the ground via center leg element (123) and is braced against the ground by opposing lower leg element (131), which is also deployed. Upper frame (127) is braced against the ground by upper leg element (125), also in deployed position. As discussed elsewhere herein, the distance between the opposing ends of lower frame (103) and upper frame (127) generally defines the height of the doors (109).

To collapse the blind (101), upper frame (127) is folded towards lower frame (103) (trapping therebetween the doors (109)). FIG. 8B depicts the blind (101) with upper frame (127) folded back against lower frame (103). Next, upper leg element (125) is counter-folded against upper frame (127) as depicted in FIG. 8C, and lower leg element (131) is folded against the bottom of lower frame (103) as depicted in FIG. 8C. This results in the collapsed configuration shown in FIGS. 5 and 6. Generally, prior to beginning the collapsing method, the doors are closed and the skirt is folded up on top of the doors so that when the device is collapsed the doors and skirt are trapped or contained within the collapsed structure. This inhibits the doors and skirt from opening or sliding out, maintaining a compact and easy-to-transport configuration of the collapsed blind (101).

In an embodiment, some or all of the exterior of the blind (101), including but not necessarily limited to the skirt (117) and/or doors (109), comprises a means or system for attaching camouflaging material to the blind (101), such as grasses, reeds, plants, branches or sticks, or other materials selected for the particular environment and season. In an embodiment, this attaching means or system comprises a mesh webbing, or one or more hooks, loops, pockets, or other attaching means known in the art disposed at various locations on the skirt (117) and/or doors (109). In certain uses, such camouflage may be preferred over a camouflage print, as the print may actually be counterproductive if it does not match a particular environment or season. In such instances, it may be preferred that the print on the skirt (117) and/or doors (109) be a shade or color, and that elements be attached to the blind (101) to provide further camouflaging. Such elements may be artificial materials or natural materials, such as grasses or other materials selected from the environment in which the blind (101) is used.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

By way of example and not limitation, in an embodiment, the lower leg element may comprise independent vertical supports or stems, which may be moved independently of each other. Alternatively, the lower leg element may be connected by an alternative stabilizing structure, such as a set of X-shaped crossbars, similar to a fold-out cot. Alternatively the lower leg element may comprise a Y-shaped leg component wherein the top ends of the Y are hingedly attached to the lower frame and the stem of the Y stabilized the apparatus on the ground. In a still further embodiment, the lower leg element may be attached to the crossbar at the foot end of the lower frame. Similarly, these alternative structures may also, or additionally, be used for the upper kg element and its attachment to corresponding structures of the upper frame.

Also by way of example and not limitation, in an alternative embodiment, the skirt and/or doors may be configured to be removable and replaceable, facilitating the use of the layout blind in a number of different environments and/or weather conditions. In a further embodiment, the seating element may be suspended from opposing ends of the layout blind in a hammock- or sling-style seat, rather than attached laterally to the side rails. This may be done, for example, by including an additional crossbar in the bottom frame for attaching the bottom of the seat element.

Also by way of example and not limitation, in an embodiment, the base of the doors may comprise a metal tubing insert. In another embodiment, the layout blind further comprises a cam disposed on the foot-end crossbar of the lower frame for the door or doors to rest upon. In another embodiment, the layout blind may comprise armrests. In a further embodiment, the armrests may be removable or foldable.

Also by way of example and not limitation, in alternative embodiments, the blind may be collapsible in tri-fold fold configuration, or a four-fold, or additional folding configurations. In another embodiment, the skirt may comprise tubing ensheathed at the outside edges, which tubing weighs down the skirt to hold it in place, replacing the function of the stakes.

In a still further embodiment, the frame structures are sized and shaped to accommodate both an adult human hunter and a hunting dog. In another alternative embodiment, the frame structures are sized and shaped to accommodate a hunting dog along with, or instead of, the hunter (e.g., a smaller size with a seating element configured and disposed to accommodate a canid).

In a still further embodiment, the device may include a flooring system, such as, but not necessarily limited to, a waterproof or moisture-resistant canvas, vinyl, plastic or other appropriate ground skirt. This element may be attached to, or separate from the layout blind, and may provide additional insulation, warmth, and protection from ground moisture and pests. In an embodiment in which the flooring is attached to the layout blind, it is removable therefrom.

In a still further embodiment, the doors may be replaced, or supplemented, by an attached, removable, and or separate sheet, which the hunter drapes or pulls over him or herself to conceal the hunter in the reclining position. This sheet also may be water-resistant and thermally insulated, providing additional warmth and protection.

In a still further embodiment, the shoulder raps may be replaced, or supplemented, by an attached carrying handle. Alternatively, the blind may comprise a hag or wrap into which the blind may be placed for storage and transportation.

In a still further embodiment, the strap for holding the collapsed blind together may be replaced, or supplemented, by a latch or hook and loop system.

Throughout this disclosure, relative terms such as "generally," "about," and "approximately" may be used, such as, but not necessarily limited to, with respect to shapes, sizes, dimensions, angles, and distances. One of ordinary skill will understand that, in the context of this disclosure, these terms are used to describe a recognizable attempt to conform a device to the qualified term. By way of example and not limitation, components described as being "generally coplanar" will be recognized by one of ordinary skill in the art to not be, in a strict geometric sense, coplanar, because a "plane" is a purely geometric construct that does not actually exist, and no component is truly "planer" in the geometric sense, nor are two components ever truly coplanar. Variations from geometric descriptions are inescapable due to, among other things: manufacturing tolerances resulting in shape variations, defects, and imperfections; non-uniform thermal expansion; and natural wear. There exists for every object a level of magnification at which geometric descriptors no longer apply due to the nature of matter. One of ordinary skill will understand how to apply relative terms such as "generally," "about," and "approximately" to describe a range of variations from the literal meaning of the qualified term in view of these and other considerations.

The invention claimed is:

1. A layout hunting blind configured to collapse into a carryable configuration, comprising:
   a seating element;
   a lower frame comprising a foot end and two lower frame opposing sidebars having a first part of said seating element attached thereto and disposed therebetween
   an upper frame comprising:
      a head end disposed at the opposing end of said layout hunting blind from said foot end when said layout hunting blind is unfolded; and
      two opposing upper frame sidebars having a second part of said seating element attached thereto and disposed therebetween, said upper frame hingedly attached to said lower frame, said attachment configured such that said upper frame and said lower frame may be folded together to dispose said two lower frame sidebars and said two upper frame sidebars in an adjacent and generally parallel position;
   a lower leg element having a distal end and being hingedly attached at an opposing proximal end to said lower frame, said attachment configured such that said lower leg element and said lower frame may be folded together to dispose said two lower frame sidebars and said lower leg element in an adjacent and generally parallel position;
   an upper leg element having a distal end and being hingedly attached at an opposing proximal end to said upper frame, said attachment configured such that said upper leg element and said upper frame may be folded together to dispose said two upper frame sidebars and said upper leg element in an adjacent and generally parallel position;
   a fabric skirt attached to said upper frame and said lower frame and configured to hide said lower leg element and said upper leg element from view when said layout blind is unfolded and configured to have a generally linearly taut portion from said head end to said foot end when said hunting blind is unfolded; and
   a door attached to said fabric skirt at said generally linearly taut portion;
   wherein said seating element is configured to accommodate a human in a reclining position when said layout hunting blind is unfolded.

2. The layout hunting blind of claim 1, wherein said door is sized and shaped such that when said door is closed, a human occupant reclining in said layout hunting blind is hidden from view.

3. The layout hunting blind of claim 1, where said door comprises at least two rigid panels disposed in a fabric sheathe, said door being foldable between said at least two rigid panels.

* * * * *